United States Patent [19]

Bordini et al.

[11] 4,232,089

[45] Nov. 4, 1980

[54] POLYOLEFIN FILMS WITH A HIGH RESISTANCE TO STICKING AGAINST WELDING BARS HAVING A TOP COATING COMPRISING A COMBINATION OF AN EPOXY RESIN, AN ACRYLIC RESIN AND NITROCELLULOSE

[75] Inventors: Fosco Bordini; Luigi Mauri, both of Terni, Italy

[73] Assignee: Moplefan S.p.A., Milan, Italy

[21] Appl. No.: 953,875

[22] Filed: Oct. 23, 1978

[30] Foreign Application Priority Data

Oct. 24, 1977 [IT] Italy ................................ 28895 A/77

[51] Int. Cl.$^2$ .............................................. B32B 27/38
[52] U.S. Cl. .................................... 428/413; 426/127; 427/412.3; 428/523; 428/910
[58] Field of Search ............... 428/910, 516, 413, 520, 428/523; 427/407, 407 E; 426/127

[56] References Cited

U.S. PATENT DOCUMENTS

| | | | |
|---|---|---|---|
| 3,753,769 | 8/1973 | Steiner | 428/516 |
| 3,923,574 | 12/1975 | Vercauteren | 428/520 X |

*Primary Examiner*—James C. Cannon

[57] ABSTRACT

Films comprising alpha-olefin polymers, such as normally solid polypropylene consisting essentially of recurring propylene units and having a substantial crystalline polypropylene content, and in particular isotactic polypropylene, are rendered easily thermoweldable and/or impervious to gases and vapors, and also given improved resistance to sticking against the welding bars of automatic and semi-automatic machines conventionally used for the manufacture of containers, envelops, bags, vessels and, in general, other manufactured articles useful in the packaging industry, by coating the films with a first layer comprising a polyalkyleneimine and a second layer comprising a mixture of an epoxy resin, an acrylic or methacrylic polymer or copolymer, and nitrocellulose.

16 Claims, No Drawings

POLYOLEFIN FILMS WITH A HIGH RESISTANCE TO STICKING AGAINST WELDING BARS HAVING A TOP COATING COMPRISING A COMBINATION OF AN EPOXY RESIN, AN ACRYLIC RESIN AND NITROCELLULOSE

THE PRIOR ART

Patents assigned to Montedison S. p. A. describe methods for preparing films of the alpha-olefin polymers made up of macromolecules having, prevailingly, the stereoregular structure, isotactic, and obtained by polymerizing propylene in the presence of stereospecific catalysts.

Because of their mechanical, protective and optical properties, films obtained from crystalline, polyolefins, in particular polypropylene, are materials the widest field of application of which is in the packaging industry.

One difficulty encountered in adapting such films for use in the packaging art is that for the most part the conventionally available automatic and semi-automatic machines cannot be used for the purpose inasmuch as the machines are not capable of processing and transforming thermoplastic films, such as those made of polyolefins, in particular those made of polypropylene. This is due to the fact that the automatic and semi-automatic machines have been designed and built keeping in mind the characteristics of the packaging material most widely used up to now, that is, the cellophane film.

The basic difference between the polyolefinic films, in particular those of polypropylene, and the cellophane films, consists in the fact that the polyolefin films are thermoplastic materials while cellophane is a material that is insensible to heat at temperatures lower than its inflammable temperature.

This involves, as a consequence, a different behavior of the two types of materials with respect to the automatic thermowelding devices mounted on the standard packaging machines. In fact, while cellophane, which is normally coated with a thermoweldable lacquer that makes it thermoweldable, actually can be wleded on the conventional machines without any difficulty at all, the polyolefinic films, especially those of polypropylene, melt at the point of contact with the welding elements and, thus, tend to stick to these latter and tend to tear, making it practically impossible to maintain a commercially reasonable operating speed of the machine.

It is known to improve the thermoweldability and impermeability characteristics, as well as other properties of the synthetic polymeric films, by coating the film with materials capable of imparting said characteristics to the films.

In general, the known methods involve coating the supporting film by extruding a molten lacquer on the supporting film (extrusion coating). Still another method is the socalled "lamination" of two films against each other, with or without adhesives. A further method consists in spreading a solution of the coating agent in a suitable solvent on the supporting film. The coating agent may be coupled to an anchoring agent (primer) which facilitates the adhesion of the coating to the supporting film. Often the primer is substituted by, or used with, a pre-treatment of the supporting film with chemical agents, electrical non-piercing discharges, a flame, or other suitable pre-treatment.

Also known are processes consisting in coating the polyolefinic film with:

(a) a first layer of an imino compound, in particular polyethylenimine which favors anchoring of the lacquer to the support; and with (b) a second layer consisting of mixtures of epoxy resins and vinyl or vinylidene polymers or copolymers, or consisting of mixtures of epoxy resins, vinyl or vinylidene polymers or copolymers plus alkyl acrylate and/or alkyl methacrylate polymers.

The coated films thus obtained show very good values of resistance of the weld but have a poor resistance to sticking to welding bars.

THE PRESENT INVENTION

One object of this invention is to provide polyolefin films which are thermoweldable, can be converted to packages on the automatic and semi-automatic machines used conventionally for converting films into packages, and which have improved resistance to sticking to the welding bars of said machines, and, in addition, satisfactory optical properties.

This and other objects are achieved by the present invention in accordance with which the polyolefinic films are provided with two coatings as follows:

(A) a first coating or layer consisting of amino or imino compounds; and
(B) a second layer consisting of a mixture of
   (a) 10–30% by weight of epoxy resins;
   (b) 30–70% by weight of acrylic or methacrylic polymers or copolymers; and
   (c) 10–40% by weight of nitrocellulose.

The coatings may be applied on either biaxially stretched or unstretched polyolefin films electrically pretreated or untreated. When said coatings are applied on unstretched film, or on a film stretched in one direction only, additional stretching or stretchings are carried out after the coating.

The electrical treatment of the film is preferably carried out with SCAE-type devices, but other similar, equivalent devices are suitable and can be used.

The coating may be applied either on one or on both sides of the polyolefin film, and by conventional methods, using solutions or dispersions of the coating agents in water or in organic solvents. Likewise, other conventional coating methods, such as, more particularly, buttering, dipping or the like may be utilized.

The thickness of the coating may vary from 1 to $20\mu$.

The first layer consists, preferably, of polymers of alkylimines such as polyethylenimine, polypropylenimine and the like, or of amine compounds of low molecular weight, such as for instance ethylendiamine, diethylentriamine, tetraethylenpentamine and the like.

Among the epoxy resins particularly suited for our purpose are the condensation products of epichlorohydrin with phenols.

Acrylic and methacrylic polymers and copolymers particularly suited for use in the practice of this invention include: polymethylmethacrylate, polyethylmethacrylate, polymethylacrylate, polyethylacrylate, the copolymers: methylacrylate/ethylacrylate, methylmethacrylate/ethylmethacrylate, methylmethacrylate/n-butylmethacrylate and the like.

The nitrocellulose suited for the use according to this invention is a nitration product of cellulose, having a nitrogen content comprised between 11.5% and 12.5% and corresponding to WASAG 34E standard (see ULLMANS, Encyclopaedie der Technischen Chemie, Vol. 12, 797, 1960).

The degree of adhesion of the coating to the supporting film is measured by pressing a piece of a self-adhesive cellulose tape against the surface of the coated film and then abruptly stripping said cellulosic tape off the surface. The coatings with an excellent adhesion will remain firmly attached to the supporting film. On the contrary, the coatings with a poor or bad adhesion will be partially or totally stripped off from the supporting film.

Besides the adhesion, with the "peeling test" method there is also measured the tensile stress resistance of the weld, which is evaluated by means of a dynamometer.

The "peeling test" values are considered 'good' when they exceed 80–100 g/cm. However, the welding resistance values must be referred to the type of application for which the coated film is intended. Thus, 80–100 g/cm may be considered an excellent value when the application relates to, for instance, the weld of a coated film intended for the wrapping of cigarettes. Quite different, on the contrary, is the case of the application of the coated film to the manufacture of container bags for rice, sugar, and the like, for which much higher weld resistance values are required.

The extent of sticking of the coated film to the welding elements is determined by measuring, with an Instron dynamometer, the force required per surface unit $(g/cm^2)$ for detaching (removing) from the welding elements a test piece connected to a dynamometer and subjected to welding conditions similar to those usually applied on standard packaging machines (temperature = 130° C., pressure = 40 psi, time = 1 second).

In a presently preferred embodiment, the supports to which the thermoweldable coatings are applied according to this invention consist of films obtained from polypropylene polymers obtained by polymerizing propylene in the presence of stererospecific catalysts.

Various adjuvants may be added to the polymer before it is formed into a film, such as stabilizers, lubricants, plasticizers, dyeing pigments, anti-static agents, fillers and the like.

The following examples are given to illustrate the invention in more detail but are not intended to be limiting since changes and variations can be made in practicing this invention without departing from the spirit and scope thereof.

EXAMPLE 1

A polypropylene film obtained by extrusion of a propylene polymer consisting prevailingly of macromolecules having isotactic structure, stretched and with a thickness of 30 micron, was subjected to electronic treatment on a SCAE-type device. The film was then coated on one side with a 1% polyethyleneimine aqueous solution by means of a conventional machine for buttering thin sheets. Thereafter, the film was dried in an oven and then coated with a second layer consisting of a mixture of, by weight:
 (a) 60% of polymethylmethacrylate having $[\eta]$, measured in $CHCl_3$, at 20° C., = 0.20; and
 (b) 20% of epoxy resin obtained by polycondensation of epichlorohydrin with bisphenol A, and having a mean molecular weight = 1000; and
 (c) 20% of 34E nitrocellulose (nitrogen = 12%, $[\eta]$ in acetone = 0.4).

The polymers were applied as a 25% solution in methylethylketone.

The solution was prepared at a temperature of 70° C. After spreading, the film was dried in an oven at 90° C. The coated film showed the following characteristics:
 thickness of the coating: $1.8\mu$
 adhesion (scotch-tape test): excellent
 blocking at 43° C. (ASTM D 1146-53): good
 transparency: excellent
 slippiness (static attrition coefficient T.M.I.): fairly good
 resistance of the weld: 300 g/cm
 welding temperature: 130° C.
 sticking to welding bars at 130° C.: 80 $g/cm^2$

EXAMPLE 2

A polypropylene film obtained by extrusion of a polymer of the propylene consisting prevailingly of macromolecules having isotactic structure, stretched and having a thickness of 30 micron, was subjected to an electronic treatment with a SCAE-type device and was then treated on one side, using a standard buttering and coupling machine for thin sheets, with an aqueous 1% solution of polyethyleneimine. Thereafter the film was dried and coated with a second layer consisting of a mixture of, by weight:
 (a) 40% of polymethylmethacrylate having $[\eta]$ (measured in $CHCl_3$ at 20° C.) = 0.20;
 (b) 25% of epoxy resin obtained by polycondensation of epichlorohydrin with bisphenol A, having a mean molecular weight equal to 1000;
 (c) 35% of nitrocellulose, norm 34E (nitrogen = 12%, $[\eta]$ in acetone = 0.4);

The polymers were applied as a 25% solution in methylethylketone at a temperature of 70° C. After spreading, the film was dried at 90° C. The coated film showed the following characteristics:
 thickness of the coating: $1.8\mu$
 adhesion (scotch-tape test): excellent
 blocking at 43° C. (ASTM D 1146-53): good
 transparency: excellent
 slippiness (static attrition coefficient T.M.I.): good
 resistance of the weld ("peeling" test): 250 g/cm
 welding temperature: 130° C.
 sticking to welding bars at 130° C.: 65 $g/cm^2$.

EXAMPLE 3

A polypropylene film obtained by extrusion of a propylene polymer consisting prevailingly of isotactic macromolecules, stretched and having a thickness of 30 micron, was subjected to an electronic treatment with a SCAE-type device, on one side, using a standard buttering and coupling machine for thin sheets, by applying an aqueous 1% polyethyleneimine solution. Thereupon the film was dried in an oven and then coated with a second layer consisting of a mixture of, by weight:
 (a) 50% of butylmethacrylate/methylmethacrylate (25/75) copolymer having $[\eta] = 0.25$ (measured in $CHCl_3$ at 20° C.);
 (b) 20% of epoxy resin obtained by polycondensation of epichlorohydrin with bisphenol A, and having a mean molecular weight = 1000;
 (c) 30% of 34E nitrocellulose (12% nitrogen and $[\eta]$ in acetone = 0.4).

The polymers were applied as a 25% solution in methylethylketone, at a temperature of 70° C.

After the spreading, the film was dried at 90° C. The coated film had the following characteristics:
 thickness of the coating: $1.7\mu$
 adhesion (scotch-tape test): excellent blocking at 43° C. (ASTM D 1146-53): good
transparency: excellent
slippiness (static attrition coefficient T.M.I.): good
resistance of the weld ("peeling" test): 400 g/cm
welding temperature: 130° C.
sticking to welding bars at 130° C. 80 g/cm$^2$

EXAMPLE 4

A polypropylene film obtained by extrusion of a propylene polymer consisting prevailingly of macromolecules of isotactic structure, stretched and with a thickness of 30 micron, was subjected to an electronic treatment on a SCAE-type device and was then coated on one side, using a standard buttering and coupling machine for thin sheets, with an aqueous 1% solution of polyethylenimine solution.

The thus coated film was then dried in an oven and successively coated with a second layer consisting of a mixture of, by weight:

(a) 40% of 34E nitrocellulose (12% nitrogen and $[\eta]$ in acetone=0.40);
(b) 10% of an epoxy resin obtained by polycondensation of epichlorohydrin with bisphenol A, having a mean molecular weight=450;
(c) 50% of polymethylmethacrylate having $[\eta]$=0.20 (measured in CHCl$_3$ at 20° C.);

the solution was prepared at a temperature of 70° C.
After spreading, the film was dried at 90° C. The coated film showed the following characteristics:
thickness of the coating: 1.8μ
adhesion (scotch-tape test): excellent
blocking at 43° C. (ASTM D 1146-53): good
transparency: excellent
slippiness (static attrition coefficient T.M.I.): good
resistance of the weld ("peeling" test): 300 g/cm
welding temperature: 130° C.
sticking to welding bars at 130° C.: 10 g/cm$^2$.

EXAMPLE 5

A polypropylene film obtained by extrusion of a propylene polymer consisting prevailingly of macromolecules of isotactic structure, stretched and with a thickness of 30 micron, was subjected to an electronic treatment with a SCAE-type device, and was coated on one side using a standard buttering and coupling machine for thin sheets, with an aqueous 1% solution of polyethylenimine. Thereupon, the film was dried in an oven and then coated with a second layer consisting of a mixture of, by weight:

(a) 30% of 34E nitrocellulose (12% nitrogen and $[\eta]$ in acetone=0.4);
(b) 30% of an epoxy resin obtained by polycondensation of epichlorohydrin with bisphenol A, and having a mean molecular weight equal to 1900;
(c) 40% of polymethylmethacrylate having $[\eta]$=0.20 (measured in CHCl$_3$ at 20° C.).

The polymers were applied as a 25% solution in methylethylketone. The solution was prepared at a temperature of 70° C.
After the spreading, the film was dried at 90° C. and the coated film showed the following characteristics:
thickness of the coating: 1.9μ
adhesion (scotch-tape test): excellent
blocking at 43° C. (ASTM D 1146-53): good
transparency: good
slippiness (static attrition coefficient T.M.I.): good
resistance of the weld ("peeling" test): 250 g/cm
welding temperature: 130° C.
sticking to the welding bars at 130° C.: 30 g/cm$^2$.

EXAMPLE 6 (Comparative)

A polypropylene film obtained by extrusion of a propylene polymer consisting prevailingly of macromolecules of isotactic structure, stretched and with a thickness of 30μ, was subjected to an electronic treatment with a SCAE-type device, and then coated on one side using a standard buttering and coupling machine for thin sheets, with an aqueous 1% polyethyleneimine solution. Thereupon, the film was dried in an oven and was then coated with a second layer consisting of a mixture of, by weight:

(a) 80% of a butylmethacrylate/methylmethacrylate (25/75) copolymer having $[\eta]$ measured in CHCl$_3$ at 20° C.=0.25);
(b) 20% of an epoxy resin obtained by polycondensation of epichlorohydrin with biphenol A, and having a mean molecular weight=1000;

The polymers were applied as a 25% solution in methylethylketone. The solution was prepared at a temperature of 70° C.
After spreading, the film was dried at 90° C. and the thus coated film had the following characteristics:
thickness of the coating: 2μ
adhesion (scotch-tape test): excellent
blocking at 43° C. (ASTM D 1146-53): fair
transparency: excellent
slippiness (static attrition coefficient T.M.I.): poor
resistance of the weld ("peeling" test): 350 g/cm
welding temperature: 130° C.
sticking to welding bars at 130° C.: 650 g/cm$^2$.

EXAMPLE 7 (Comparative)

A polypropylene film obtained by extrusion of a propylene polymer consisting prevailingly of macromolecules of isotactic structure, stretched and having a thickness of 30μ, was subjected to an electronic treatment on a SCAE-type device, and then coated on one side, using a standard buttering-coupling machine for thin sheets, with an aqueous 1% solution of polyethyleneimine. Thereupon, the film was dried in an oven and thereafter coated with a second layer consisting of a mixture of, by weight:

(a) 80% 34E nitrocellulose (12% nitrogen and $[\eta]$ in acetone=0.4);
(b) 20% of an epoxy resin obtained by polycondensation of epichlorohydrin with bisphenol A, and having a mean molecular weight=1000.

The polymers were applied at a temperature of 70° C. After spreading, the coated film was then dried at 90° C. and had the following characteristics:
thickness of the coating: 2μ
adhesion (scotch-tape test): excellent
blocking at 43° C. (ASTM D 1146-53): good
transparency: excellent
slippiness (static attrition coefficient T.M.I.): good
resistance of the weld ("peeling" test): does not weld
welding temperature: 130° C.
sticking to the welding bars at 130° C.: 5 g/cm$^2$

EXAMPLE 8 (Comparative)

A polypropylene film obtained by extrusion of a propylene polymer consisting prevailingly of macromolecules with an isotactic structure, stretched, and having a thickness of 30μ, was subjected to an electronic treatment on a SCAE-type device, and then coated on one of its sides, using a standard buttering-coupling machine for thin sheets, with an aqueous 1% solution of polyethyleneimine. The film was then dried in an oven and coated with a second layer consisting of a mixture of, by weight:
- (a) 80% of polymethylmethacrylate having $[\eta]=0.20$ (measured in $CHCl_3$ at 20° C.);
- (b) 20% of 34E nitrocellulose (12% nitrogen and $[\eta]$ in acetone=0.4);

The polymers were applied as 25% solution in methylethylketone. The solution was prepared at a temperature of 70° C.

After spreading, the coated film was dried at 90° C. and showed the following characteristics:
- thickness of coating: $2\mu$
- adhesion (scotch-tape test): excellent
- blocking at 43° C. (ASTM D 1146-53): good
- transparency: excellent
- slippiness (static attrition coefficient T.M.I.): good
- resistance of the weld ("peeling" test): does not weld
- welding temperature: 130° C.
- stickiness on welding bars at 130° C.: 10 g/cm².

EXAMPLE 9 (Comparative)

A polypropylene film obtained by extrusion of a propylene polymer consisting prevailingly of isotactic macromolecules, stretched and with a thickness of 30 micron, was subjected to an electronic treatment on a SCAE-type device, and then coated on one side, using a standard buttering machine for thin sheets, with an aqueous 1% solution of polyethyleneimine. The thus coated film was dried in an oven and coated with a second layer of 100% 34E nitrocellulose (12% nitrogen and $[\eta]$ in acetone=0.4).

The polymer of the second layer was applied as a solution in methylethylketone with a content of 25% of dry substance. The solution was prepared at a temperature of 70° C.

After the spreading, the coated film was dried at 90° C. and the thus coated film showed the following characteristics:
- thickness of the coating: 1.5 micron
- adhesion (scotch-tape test): excellent
- resistance to crumpling: excellent
- blocking at 43° C. (ASTM D 1146-53): excellent
- transparency: excellent
- slippiness (static attrition coefficient T.M.I.): excellent
- resistance of the weld ("peeling" test): does not weld
- welding temperature: 130° C.
- stickiness on welding bars at 130° C.: 5 g/cm²

In a preferred embodiment of this invention, the polyolefinic film is a film of normally solid polypropylene consisting essentially of recurring propylene units, having a substantial crystalline polypropylene content. In a still further preferred embodiment the polyolefinic film is a film of high molecular weight polypropylene consisting essentially of isotactic polypropylene made up of isotactic macromolecules insoluble in n-heptane and having substantially the isotactic stereoregular structure.

What we claim is:

1. Films of a polyolefin consisting essentially of isotactic macromolecules and carrying on at least one surface thereof a coating constituted by two layers, a first layer consisting of an alkylenimine polymer or a low molecular weight polyamine and a second layer consisting of a mixture of, by weight:
   - (a) 10-30% of an epoxy resin;
   - (b) 30-70% of an acrylic or methacrylic polymer or copolymer; and
   - (c) 10-40% of nitrocellulose having a nitrogen content between 11.5 and 12.5%.

said coated film being readily thermoweldable and showing improved resistance to sticking to the bars of welding machines, without loss of their optical properties, as compared to the uncoated polyolefin films.

2. Films according to claim 1, the film being formed of normally solid polypropylene consisting essentially of recurring propylene units and having a substantial crystalline polypropylene content.

3. Films according to claim 1, the film being formed of polypropylene consisting essentially of isotactic polypropylene made up of isotactic macromolecules which are insoluble in boiling n-heptane and have substantially the isotactic stereoregular structure.

4. Process for improving the weld-resistance and resistance to sticking to the welding bars of a polyolefinic film, without altering its optical properties, which comprises applying to said film a first coating consisting of an alkylenimine polymer or a low molecular weight polyamine, and thereafter applying over the first coating a second coating consisting of a mixture of, by weight:
   - (a) 10-30% of epoxy resins;
   - (b) 30-70% of acrylic or methacrylic polymers or copolymers; and
   - (c) 10-40% of nitrocellulose having a nitrogen content between 11.5 and 12.5%.

5. The process of claim 4 in which the starting polyolefinic film is an unstretched film.

6. The process of claim 4, in which the starting polyolefinic film is a film which has been pre-stretched biaxially.

7. The process of claim 4, in which the starting polyolefinic film is a film of normally solid polypropylene consisting essentially of recurring propylene units and having a substantial crystalline polypropylene content.

8. The process of claim 4, in which the starting polyolefinic film is a film of polypropylene consisting essentially of polypropylene made up of isotactic macromolecules.

9. The process of claim 4, in which the epoxy polymer comprised in the second coating applied to the polyolefinic film is a polycondensate of epichlorhydrin and a phenol.

10. The process of claim 4 in which the acrylic or methacrylic polymer or copolymer comprised in the second coating applied to the polyolefinic film is selected from the group consisting of polymethylacrylate, polymethylmethacrylate, polyethylacrylate, polyethylmethacrylate, copolymers of methylacrylate and ethylacrylate, copolymers of methylmethacrylate and ethylmethacrylate, and copolymers of methylmethacrylate and butylmethacrylate.

11. The process of claim 4 in which in either or both of the first and second coatings applied to the polyolefinic film there is incorporated adjuvants selected from the group consisting of stabilizers, lubricants, plasticizers, dyes and antistatic agents.

12. The process of claim 4 in which one or both of the two coatings is applied to the polyolefinic film before stretching thereof and the coated film is then stretched in one direction.

13. The process of claim 4 in which one or both of the coatings is applied to the polyolefinic film before stretching thereof and the coated film is then subjected to biaxial stretching.

14. The process of claim 4, in which the first coating applied to the polyolefinic film is constituted by an alkylenimine polymer.

15. The process of claim 14, in which the alkylenimine polymer is polyethylenimine.

16. The process of claim 14, in which the alkylenimine polymer is polypropylenimine.

* * * * *